United States Patent [19]

Jacobson

[11] 4,432,932

[45] Feb. 21, 1984

[54] REACTOR HEAD SHIELDING SYSTEM

[75] Inventor: Earl B. Jacobson, 510 S. Shore Dr., Crystal Lake, Ill. 60014

[73] Assignee: Earl B. Jacobson, Crystal Lake, Ill.

[21] Appl. No.: 207,183

[22] Filed: Nov. 10, 1980

[51] Int. Cl.³ .................................... G21C 11/00
[52] U.S. Cl. .................................... 376/287; 376/260; 250/519.1
[58] Field of Search .............. 376/287, 260; 250/506, 250/519

[56] References Cited

U.S. PATENT DOCUMENTS

| | | | |
|---|---|---|---|
| 2,718,598 | 9/1955 | Graf | 250/519 |
| 3,239,669 | 3/1966 | Weinberger | 250/519 |
| 3,622,432 | 11/1971 | McCluer | 250/519 |
| 4,062,518 | 12/1977 | Stivender et al. | 250/519 |
| 4,071,404 | 1/1978 | Aoki | 376/287 |
| 4,090,087 | 5/1978 | Weissenfluh | 250/519 |
| 4,123,662 | 10/1978 | Fisher | 376/287 |
| 4,126,515 | 11/1978 | Klotz et al. | 376/287 |
| 4,299,658 | 11/1981 | Meuschke et al. | 376/260 |

FOREIGN PATENT DOCUMENTS 944500 12/1963 United Kingdom ................ 376/287

Primary Examiner—Harvey E. Behrend
Attorney, Agent, or Firm—Winburn & Gray, Ltd.

[57] ABSTRACT

A modular reactor head shielding system formed from a plurality of flexible pads shaped to interleave with the edges of each adjacent pad around the reactor head. The shielding system is assembled to protect workers from radiation exposure in working in the area around the reactor head or when working on the reactor head during refueling of the reactor. The pads are formed by inserting a pair of blankets secured to one another inside a pair of outer covers which are secured to one another in offset relation to form an interleave or tongue and groove configuration to eliminate radiation paths between pads. The blankets are formed by quilting lead wool within the blanket covers. Each pad has a hanging plate secured to one end which can be hung from a frame around a reactor head or from the reactor head itself. The pads are secured to one another such as with straps to insure elimination of radiation paths therebetween.

6 Claims, 7 Drawing Figures

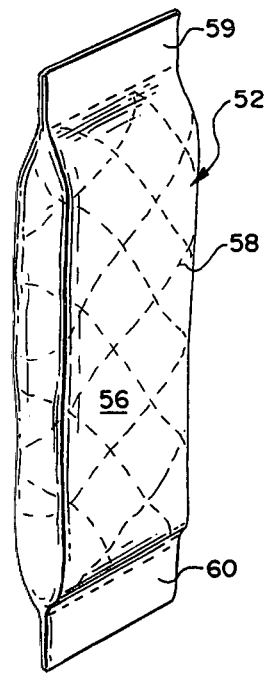
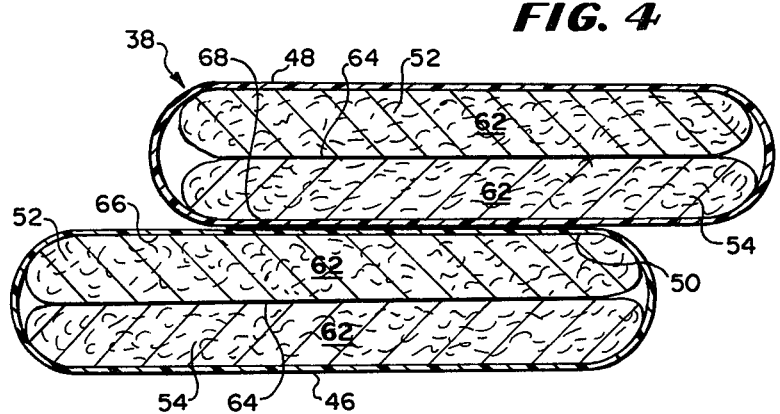
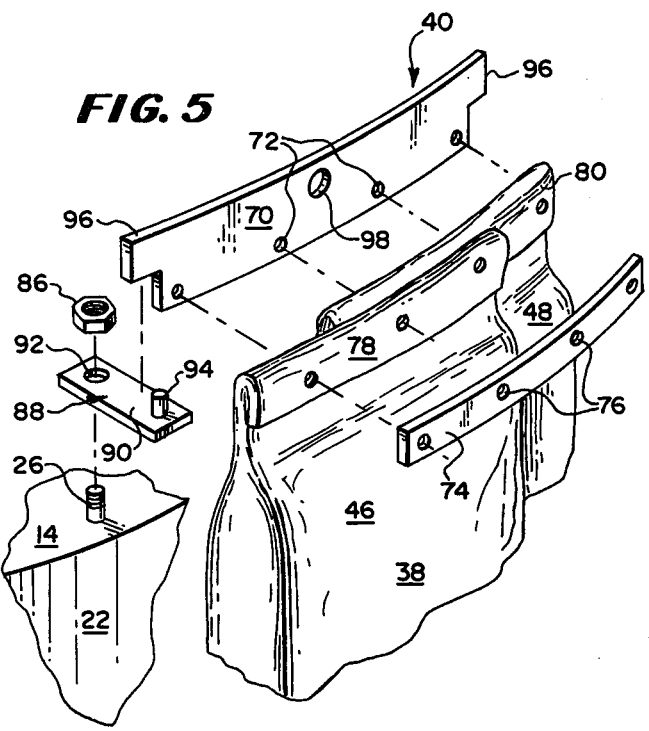
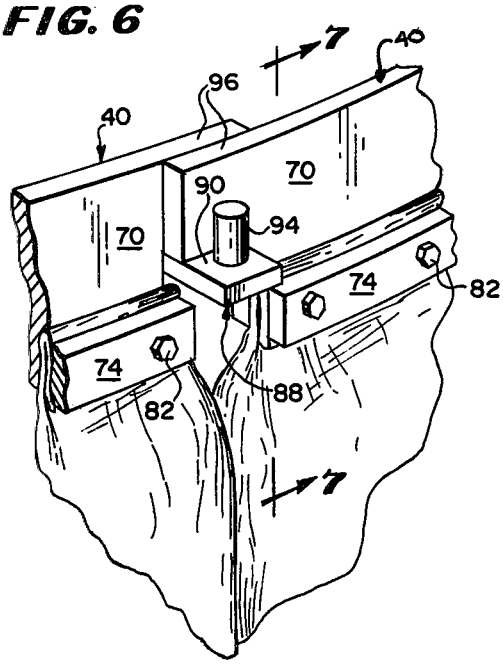
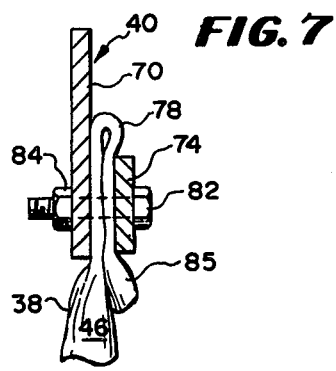

4,432,932

REACTOR HEAD SHIELDING SYSTEM

BACKGROUND OF THE INVENTION

The invention relates generally to radiation shielding systems and more particularly to a modular type reactor head shielding system designed to be temporarily assembled around a reactor head such as during refueling operations.

In nuclear power plants, the reactor heads are removed during refueling operations. The reactor head typically is situated in a concrete type well and is removed from the well during the refueling operation. During these operations it would be desirable to have the reactor head shielded so that workers are not exposed to radiation from the reactor head.

Each worker typically is attired in radiation protective clothing; however, each reactor head typically is secured by a large number of stud bolts around the top of the reactor which must be removed resulting in exposure to the workers.

Attempts to reduce this exposure have been made such as by hanging or placing lead shielding such as individual bags, around the reactor head. These non-integrated systems have several disadvantages including exposure between the single layer of bags, no system to secure the bags to the reactor head and possible damage to the reactor head by the jury rigged systems. It also is not desirable to hang the bags around the reactor head on a frame or other means since it would be preferable to move the shielding with the reactor head when it is removed to refuel the reactor. Further, the work space or well in which the reactor head is situated does not allow a large amount of clearance between the workers, the well wall and the reactor head.

SUMMARY OF THE INVENTION

The above and other disadvantages of prior art reactor head shielding techniques are overcome in accordance with the present invention by providing a modular reactor head shielding system which can be easily assembled around or on the reactor head to prevent exposure to the workers. The system is formed from a plurality of flexible pads which are shaped to interleave with one another when assembled around the reactor head. The pads are formed by inserting a pair of secured together quilted lead blankets in a pair of outer covers. The outer covers are secured to one another in offset relation to provide the interleave between pads. Each pad has a hanging plate on it which can be hung from a frame around the reactor head or from the reactor head itself.

BRIEF DESCRIPTION OF THE DRAWINGS

FIG. 3 is a perspective view of one blanket utilized in the shielding system;

FIG. 4 is a top sectional view of one pad of the shielding system;

FIG. 5 is an exploded perspective view of one hanging plate of the shielding system;

FIG. 6 is a partial perspective view of the hanging plate mounted on the reactor head; and FIG. 7 is a partial side section view of the hanging plate of FIG. 6 taken along the line 7—7 therein.

DESCRIPTION OF THE PREFERRED EMBODIMENTS

Figure 1:
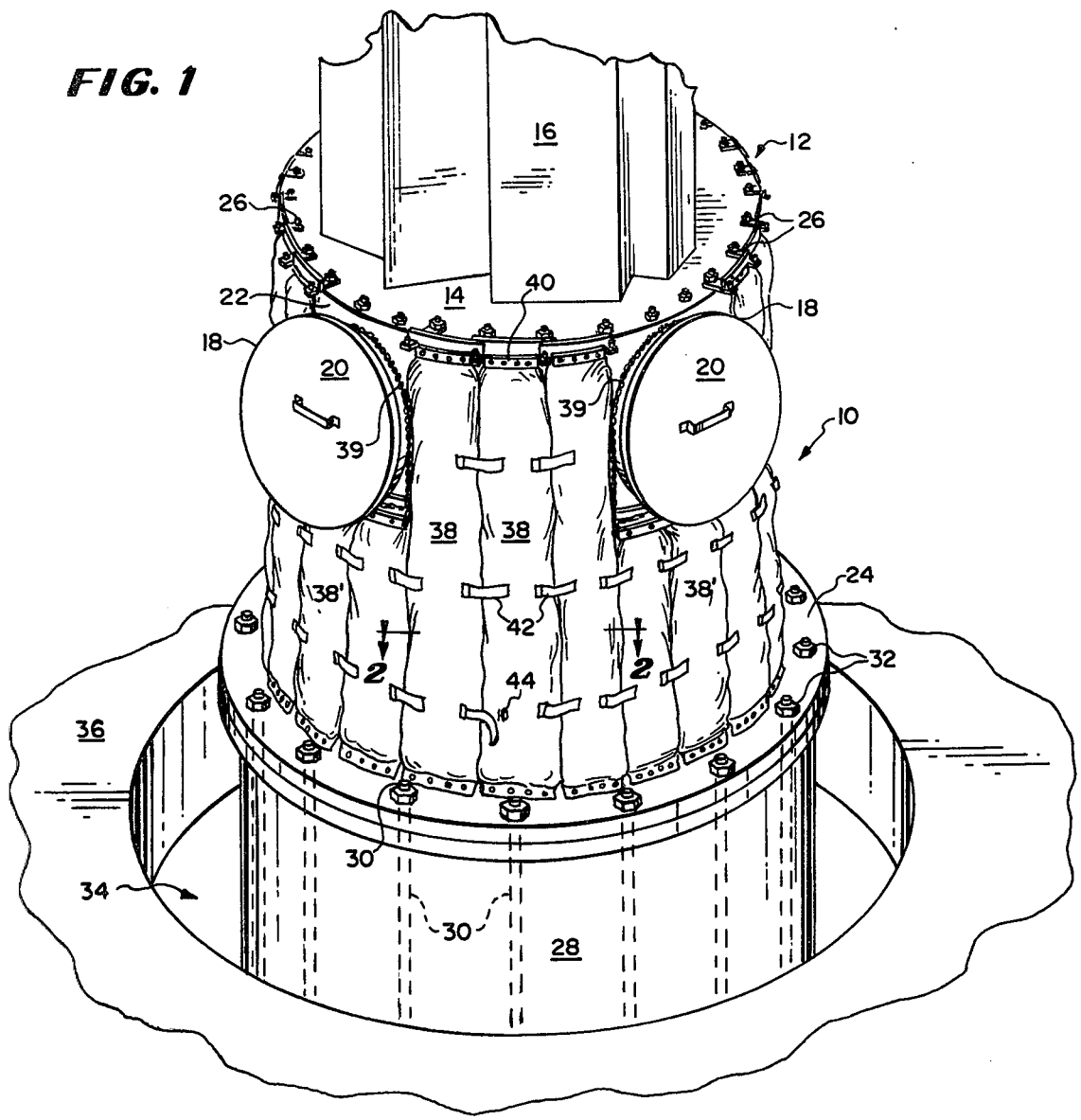
FIG. 1 is a partial perspective view of a reactor head with the modular reactor head shielding system of the invention assembled thereon.

Referring to FIG. 1, a modular reactor head shielding system embodying the invention is designated generally by the reference numeral 10. The modular reactor head shielding system or reactor shield 10 is shown operatively in place mounted on a reactor head 12. The reactor head 12 includes a top 14 from which extends control rods or a control rod cover 16. The reactor head 12 includes a plurality of vent ports 18 each of which is shown with a cover plate 20 of the reactor shield 10.

The reactor head 12 includes a generally cylindrical side 22 from which extends the vent ports 18 and which may have various shapes depending upon the manufacturer of the reactor head and may be tapered from the top 14 down to a bottom flange 24 which forms the bottom of the reactor head cover. The top 14 is typically secured to the side 22 by a plurality of bolts 26.

The reactor head 12 is secured to a reactor base 28 by a plurality of studs 30 onto which are mounted nuts 32. The reactor base 28 typically is situated in a well 34 which may include a shoulder 36 as illustrated or may be substantially upstanding around the whole reactor head 12. The nuts 32 can be removed with the shield 10 in place.

The reactor shield 10 includes a plurality of pads 38 which are hung by mounting plates 40 from the reactor top 14 such as from the bolts 26. Shorter pads 38' are hung below the vents 20 by chains or straps 39. The pads 38 and 38' interleave with one another such that there are no radiation paths between adjacent pads. The pads are secured to one another by straps 42 which can have a hook or loop of synthetic material which adheres to a mating piece 44 on the adjacent pad 38 when pressed together (such as that sold under the trademark "Velcro").

Figure 2:
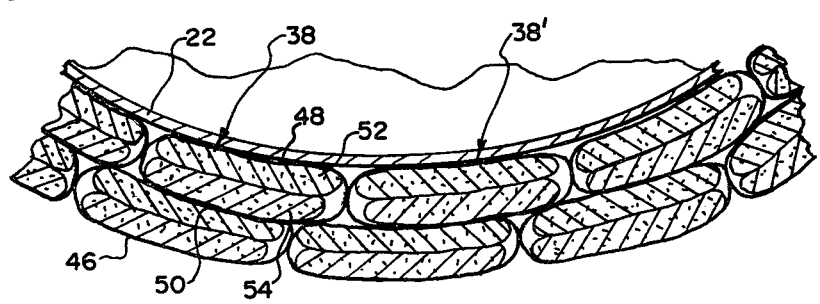
FIG. 2 is a top sectional view of a portion of the shielding system of FIG. 1 taken along the line 2—2 therein.

The interleaving or overlap of the pads 38 and 38' is best illustrated in FIG. 2. Each of the pads 38 or 38' includes a pair of outer covers or sleeves 46 and 48 which are secured together offset from one another at a seam 50. Each sleeve 46 or 48 includes a pair of blankets 52 and 54. The manufacture of the blankets 52 and 54 and pads 38 or 38' is best described with reference to FIGS. 3 and 4.

One blanket 52 is illustrated in FIG. 3. The blanket 52 includes a cover 56, such as nylon which can be plastic coated to prevent the lead from oxidizing. The cover 56 is filled with lead wool, as for example with 10 pounds per square foot. The cover 56 is then stitched with a grid type pattern 58 to secure the lead wool so that it does not shift within the blanket 52. The blanket 52 is sealed at its top and bottom ends 59 and 60 such as by sewing.

Referring to FIG. 4, the covers or sleeves 46 and 48 of one pad 38 are best illustrated, each with a pair of blankets 52 and 54 inserted therein. Each of the blankets has a lead core interior 62 formed from the stitched lead wool. Each pair of blankets 52 and 54 are secured to one another such as by glueing along a common seam 64 prior to insertion into the sleeves 46 and 48. Each pair of blankets 52 and 54 is then glued to a sleeve wall 66 and 68, respectively, adjacent to the seam 50 to provide a very strong but flexible pad 38. The outer cover or sleeves 46 and 48 can be made from nylon or reinforced polyvinyl chloride (PVC) or other suitable material preferably having a tear strength of at least 300 pounds since the total weight of each pad 38 may be on the order of 300 to 350 pounds. The shorter pads 38' weigh less than the pads 38.

The assembly of the hanging plates 40 for the pads 38 and 38' is best illustrated in FIGS. 5 through 7. The plates 40 include a large innerplate 70 with a plurality of bolt holes 72 therethrough. A mating outer plate 74 has a plurality of bolt holes 76 which match with the holes 72 in the innerplate 70. Each of the sleeves 46 and 48 has a top portion 78 and 80, respectively, folded over upon itself above the tops of the inner blankets 52 and 54 to provide a secure mounting pad for the plates 70 and 74. The top portion 78 and 80 are sandwiched between the plates 70 and 74 utilizing a plurality of bolts 82 and nuts 84. As best seen in FIG. 7 the sandwiched portion 78 has an outer end 85 which flares out further ensuring the secure mounting of the pads 38.

The bolts or studs 26 on the reactor top 14 include a nut 86 which are removed to secure a mounting arm 88 thereon. The arm 88 includes a plate 90 and a stud hole or aperture 92 which is mounted on the stud 26 and secured by the nut 86. The outer end of the mounting arm 88 includes a retaining post or pin 94.

Each of the mounting plates 40 includes a projecting mounting ear 96 at each end, which overlap one another behind the retaining post 94. The plates 40 preferably include a lifting aperture 98 into which can be placed a hook or other mechanical means to lift the pads 38 into position on the reactor head 12 or on a frame if desired. The plates 70 and 74 preferably have a shape to fit the outside of the reactor head 12.

The resulting pad assembly 38 provides a flexible shield covering which will not injure the reactor side 22 and provides a reactor head shield 10 which is easily placed around the reactor head 12 while the nuts 32 are being removed and replaced and maybe left on the reactor head throughout the work outage. The pads 38' may have the chains 41 attached to their outer bolts 82 in the plate or clamp 40. The resulting shielding with the quaddruple lead wool blankets saves approximately 25 to 30 man rems per outage which is a reduction in exposure factor of magnitudes less than that otherwise required during a refueling outage.

Many modifications and variations of the present invention are possible in light of the above teachings. The vent covers 20 can also be blankets or can be lead plates or lead poured into a frame. The scale and shape of each reactor head 12 of different manufacturers or different models would be somewhat different; however, the shaping of the pads 38 and 38' is easily accomplished within the teachings of the invention. The pads 38 and 38' preferably are tapered to fit the curvature of the reactor head 12, but also could be straight with some filler pads in between. It is, therefore, to be understood that within the scope of the appended claims, the invention may be practiced otherwise than as specifically described.

What is claimed and desired to be secured by Letters Patent of the United States is:

1. A reactor head shielding system for a nuclear power reactor head, said system comprising: a nuclear power reactor head;

a plurality of flexible shielding means secured to said reactor head in an interleaved manner to form a double layer of said shielding means at all points around the covered portion of said reactor head, said plurality of shielding means substantially covering said reactor head on at least a substantial portion around the sides of said reactor head for substantially negating radiation exposure;

each of said shielding means including an offset configuration for interleaving along the length thereof with adjacent ones of said shielding means around the reactor head, said offset configuration formed by at least two sleeves secured and assembled together, each of said sleeves being secured to one another longitudinally along the length thereof to form a sealed seam therebetween and offset transversely to one another so as to enable the formation of said interleaved double layer of said shielding means at all points around said covered portion of said reactor head when said shielding means are juxtaposed to one another and secured longitudinally to each other and to said reactor head sufficiently to substantially eliminate any direct radiation paths between said juxtaposed shielding means;

each of said sleeves including therein a pair of radiation attenuating blankets secured and assembled within an outer casing, said casings secured to one another longitudinally along the length thereof, each of said blankets and casings being secured transversely and longitudinally within its respective sleeve to eliminate any shifting and settling of radiation attenuating material when said shielding means are secured to said reactor head; and each of said shielding means including assembly means for detachably securing said shielding means to said reactor head, said assembly means including a mounting plate and plate-type means to secure one end of each of said two sleeves to said mounting plate in said offset configuration.

2. The reactor shielding system of claim 1 wherein: each blanket is formed from lead wool.

3. The reactor shielding system of claim 1 wherein: said blankets are tapered along the length thereof to conform to a tapered reactor head.

4. The reactor shielding system of claim 1 wherein: said assembly means includes straps adapted to be secured to each of said adjacent shielding means.

5. The reactor shielding system of claim 1 further including:
   means for covering the vent ports in the reactor head.

6. The reactor shielding system according to claim 5 including:
   said vent covering means including plate means shaped to cover the vent ports and adapted to fit thereover.

* * * * *